United States Patent [19]

Roller

[11] 4,054,493
[45] Oct. 18, 1977

[54] METHOD AND APPARATUS FOR CONVERTING SALINE WATER TO FRESH WATER

[76] Inventor: Paul S. Roller, 1440 N St., NW. (No. 208), Washington, D.C. 20005

[21] Appl. No.: 701,999

[22] Filed: July 1, 1976

Related U.S. Application Data

[63] Continuation-in-part of Ser. No. 531,278, March 15, 1966, abandoned, Ser. No. 834,203, June 3, 1969, abandoned, and Ser. No. 678,037, April 19, 1976, Ser. No. 387,585, Aug. 13, 1973, Pat. No. 3,951,752, and Ser. No. 444,789, Feb. 22, 1974, Pat. No. 3,951,753.

[51] Int. Cl.² .................. B01D 3/00; B01D 3/02; B01D 3/06; B01D 3/10

[52] U.S. Cl. .................. 203/7; 203/11; 203/24; 203/27; 203/79; 203/88; 203/100; 202/173; 202/174; 202/177; 202/233; 159/2 MS; 159/16 S; 159/18; 159/24 R; 159/45; 159/47 R; 159/DIG. 8; 159/DIG. 13

[58] Field of Search .................. 203/7, 10, 11, 23, 26, 203/27, 79, 88, 92, 100; 202/173, 174, 177, 180, 233, 234; 159/DIG. 8, 8, 45, 16 S; 23/301 R

[56] References Cited

U.S. PATENT DOCUMENTS

| | | | |
|---|---|---|---|
| 2,979,442 | 4/1961 | Badger | 203/7 |
| 3,026,261 | 3/1962 | Mayfield et al. | 159/47 R X |
| 3,119,752 | 1/1964 | Checkovich | 203/11 |
| 3,218,241 | 11/1965 | Checkovich | 203/88 X |
| 3,389,059 | 6/1968 | Goeldner | 203/7 X |
| 3,399,975 | 9/1968 | Otten | 203/7 X |
| 3,420,775 | 1/1969 | Cadwallader | 203/7 X |
| 3,476,654 | 11/1969 | Sieder | 202/173 X |
| 3,607,666 | 9/1971 | Roller | 203/7 |
| 3,647,638 | 3/1972 | Osdor | 159/18 |

Primary Examiner—Jack Sofer

[57] ABSTRACT

Preheated saline water, typically sea or brackish water, is further heated by quanta of steam, passed to it at differential temperatures and pressures and condensed in the saline water. Scale compounds are precipitated and scale-forming bicarbonates decomposed, with the evolution of carbon dioxide, which is gathered and expelled by steam accessory to the quanta of steam. Post-thermal saline water, which is formed, is multi-stage flash vaporized while self-cooling. The flashed vapors are compressed to form said quanta of steam. After being further cooled while preheating saline water, post-thermal saline water is evaporated in a multi-stage vapor compression evaporator, producing brine at a high concentration factor. Relative to equilibrium in scale-compound precipitation between 302° F and 347° F, the recovery of fresh water is 70% to 80% for sea water, and 80% to 90% for brackish waters over a wide range of salinity.

15 Claims, 1 Drawing Figure

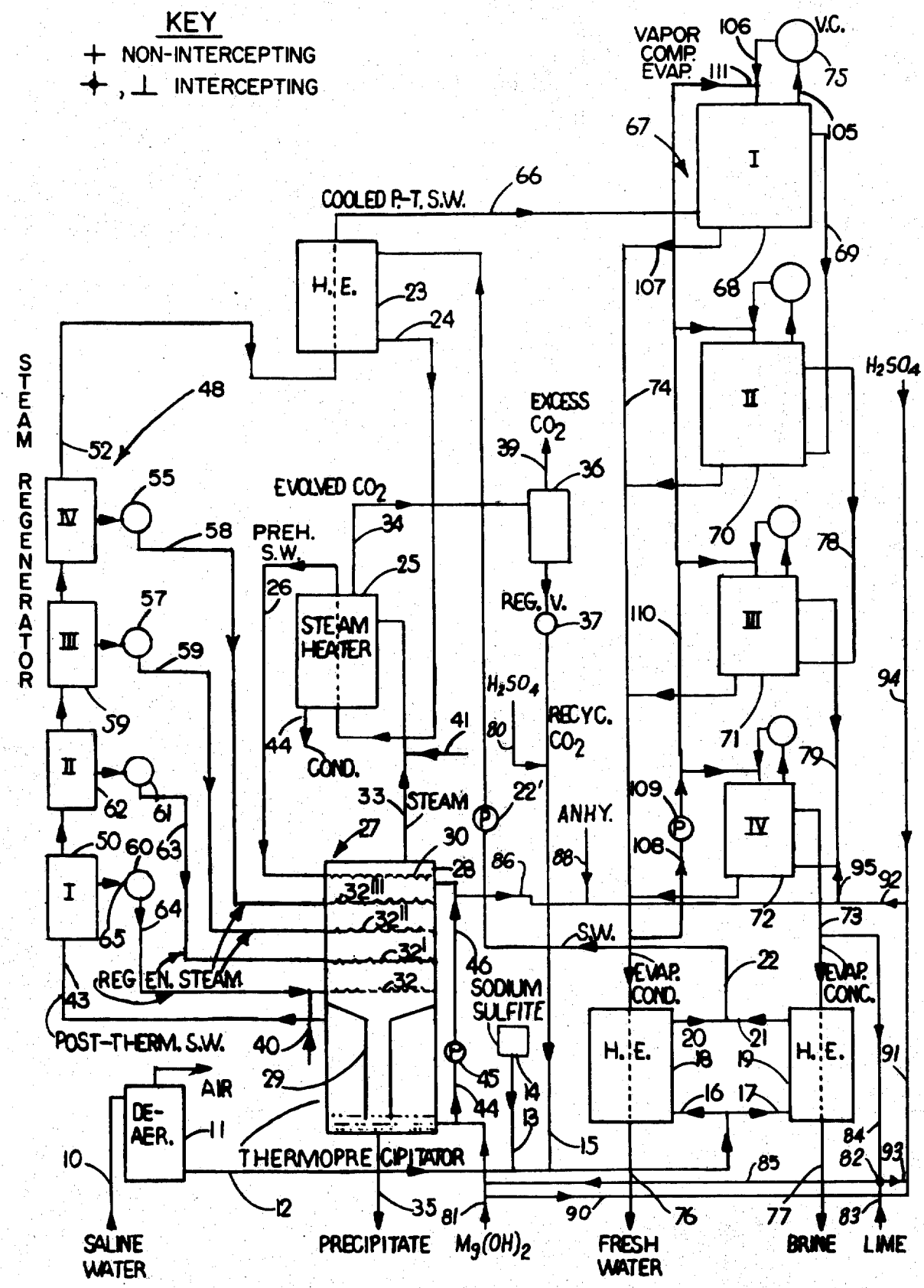

METHOD AND APPARATUS FOR CONVERTING SALINE WATER TO FRESH WATER

This application is a continuation-in-part of my former applications, Ser. No. 531,278, filed Mar. 15, 1966; Ser. No. 834,203, filed June 3, 1969, both abandoned; also Ser. No. 678,037, filed Apr. 19, 1976, Ser. No. 387,585, filed Aug. 13, 1973, now U.S. Pat. No. 3,951,752; and Ser. No. 444,789, filed Feb. 22, 1974, new U.S. Pat. No. 3,951,753. Subject matter of these applications not included herein is incorporated by reference.

The invention relates to the conversion of saline water to fresh water, with particular reference to the prior removal of scale-forming compounds from the saline water.

The dissolved solids in saline water include scale-forming compounds of calcium and magnesium bicarbonate, calcium sulfate and minor compounds containing silica, iron, phosphorus and others. Upon evaporating the saline water to produce fresh water, the scale-forming compounds are apt to deposit on the heat transfer surfaces, thereby seriously impeding heat transfer. Multistage flash evaporation avoids heat transfer surfaces in forming distillate and so has come into wide use in place of classical multiple effect and vapor compression evaporation. However, it has the serious drawback of a low recovery of fresh water, less than 17% of the original sea water. In recent years the art has attempted to increase the recovery, by combining multistage flash with multiple effect evaporation. However, the problem of scale formation has reasserted itself, bringing with it the former operational difficulties.

The invention is intended to solve the problem of scale in saline water evaporation by having as its principal object to provide for the prior removal of scale-forming compounds of whatever kind.

Another object is to provide for thermoprecipitation to remove scale-forming compounds.

Still another object is to provide for quanta of steam in effecting the elevated temperature of thermoprecipitation.

A further object is to provide for the regeneration of the quanta of steam from the saline water in which they will have condensed.

A still further object is to provide for heat transfer differentials through the use of accessory steam.

Another object is to provide for improved vapor compression evaporation in respect to a high recovery of fresh water from saline water.

With these and other objects in mind, as will become apparent in the course of the description which follows, reference is made to the drawing, which is a diagrammatic representation of the process of the invention. In the drawing, lines connecting respective parts stand for conduits and arrow-heads on the lines the direction of fluid flow. Temperatures and pressures are illustrative and not intended to be limiting. Contributory steps, such as deaeration, while desirable are not necessarily obligatory.

Saline water, which may be sea water, brackish water or an industrial or municipal process water, enters on line 10 and, passing to deaerator 11, exits in line 12. At a suitable connection thereon, it receives from line 13 and container 14 sodium sulfite or other deoxygenating agent, and from line 15 and container 36 across regulating valve 37 it receives carbon dioxide to prevent alkaline scale in subsequent preheating of the saline water.

The flow in line 12 is now split between lines 16 and 17, from which the saline water passes respectively to preheat heat exchangers 18 and 19. Exiting in lines 20 and 21, the flows are recombined in line 22 partly preheated to a temperature of 220° F to 225° F. The saline water is next passed by pump 22' through preheat heat exchanger 23, from which at 260° F it exits into line 24. It thence passes through steam heater 25, from which finally preheated it enters line 26 and distributor 30 of thermoprecipitator 27.

The final preheat temperature shall be as high as possible consistent with avoiding calcium sulfate scale in preheating. In the case of sea water in once-through flow as presently, the preheat temperature may be 270° F, and this will be taken in exemplification of the process.

Thermoprecipitator 27 comprises principally a precipitation zone and below it a clarification zone, which is characterized by a central compartment 29 in the shape of a funnel, the upper edge of which is sealed to wall 28 of thermoprecipitator 27. The precipitation zone contains saline water distributor 30, and below it illustratively four spaced distributors of quanta of steam; distributor 32 is lowermost, with distributors 32', 32" and 32'" sequentially above it. Each of said distributors is immersed in a column of saline water, the surface of which is separated from the uppermost saline water distributor 30 by a vapor space.

Finally preheated saline water is sprayed from distributor 30 through the vapor space into the saline water. As this descends, it passes sequentially across distributors 32'", 32", 32' and 32 and receives quanta of steam at the respective higher temperatures and pressures. Upon issuing from a distributor, a quantum of steam with its superheat condenses in the saline water, and further heats it while continuing to rise until completely condensed. However, part of the quantum of steam issuing from distributor 32'" may pass into the vapor space above it uncondensed and exit as excess steam into line 33. As a result of the further heating and increase in temperature of the saline water, alkaline scale compounds, chiefly in the form of magnesium hydroxide, calcium sulfate as anhydrite, and various other scale compounds precipitate, while carbon dioxide is evolved through the decomposition of scale-forming bicarbonates present in the saline water. The evolved carbon dioxide together with that which had initially been passed to the saline water flowing in line 12 exits into line 33 with the excess steam, while the precipitate is suspended in the saline water. The maximum precipitation temperature is reached around the lowermost distributor 32, as to which temperature, equilibrium in the precipitation will have been substantially reached.

After passing distributor 32, the saline water suspension flows downward into compartment 29. Flowing across the foot thereof into the annular space between said compartment and wall 28, the saline water lets fall the precipitate, which being comparatively granular settles promptly to the bottom of thermoprecipitator 27. Clarified saline water passes upward and out of thermoprecipitator 27 into line 43 as post-thermal saline water, the temperature of which is that of maximum precipitation.

Settled precipitate is drawn off as required through line 35, while a portion may be recirculated to the entering preheated saline water, as seed for hastening the precipitation, by being passed from line 44 by pump 45 to line 46 to a distributor means situated near saline water distributor 30. In view of a small percentage in the precipitate of magnesium hydroxide, it may be added by purchase as supplementary seed from line 81 connected to line 44; or, it may be self-manufactured from lime in line 83 that is added at point 82 to hot evaporator concentrate, rich in magnesium ion, passing from line 84 to said point 82, from which point the magnesium hydroxide produced is passed through line 85 to said lines 81 and 44.

The excess steam in line 33 containing evolved carbon dioxide may form part of said quanta of steam. Preferably, however, and as herein practiced, the excess steam is based solely on accessory steam, comprised of boiler steam, waste heat steam or the like.

From line 33 excess steam at a temperature differential of 10° F with respect to finally preheated saline water, and therefore at 280° F, passes with its contained carbon dioxide to steam heater 25. The steam condenses therein while saline water is preheated as previously said, the temperature differential being 10° F. Steam condensate exits at 280° F in line 44, while carbon dioxide, being substantially insoluble at this temperature, issues in line 34 to container 36, from which surplus carbon dioxide exits in line 39. Were the excess steam to be based upon quanta of steam instead of accessory steam, the condensate in line 44 would be combined with post-thermal saline water in line 43, as described in my U.S. Pat. No. 3,951,752. In the case of accessory steam, however, the condensate in line 44 is disposed of as customary in the art.

Steam regenerator 48 receives post-thermal saline water, which flash vaporizes therein while self-cooling, the flashed vapors being recovered as said quanta of steam. Four stages I to IV are shown; each comprises a flash vaporization chamber connected to a vapor compressor, which delivers compressed vapor superheated as a quantum of steam. The total of all quanta constitutes regenerated steam, passing to thermoprecipitator 27. Post-thermal saline water exits as cooled, post-thermal saline water from steam regenerator 48.

Following now the progress of the post-thermal saline water in steam regenerator 48, in chamber 50 of stage I it flash vaporizes with consequent self-cooling; flashed vapor passes through line 65 to compressor 60, from which compressed vapor is discharged as a quantum of steam into line 64 and distributor 32 in thermoprecipitator 27. The saline water surrounding said distributor is at 302° F, while the saturation temperature of the quantum of steam, corresponding to a temperature differential of 10° F, is 312° F. Accordingly, the supersaturation in said quantum is largely destroyed on contact with the saline water.

From chamber 50 the post-thermal saline water passes to chamber 62 of stage II. Here it is further flash vaporized and self-cooled; the flashed vapor issues to vapor compressor 61, from which it is discharged as a quantum of supersaturated steam into line 63 connected to distributor 32'. The saline water surrounding said distributor is at 293° F, or 10° F less than the saturation temperature of said quantum of steam. The supersaturation is thereupon largely destroyed as previously at distributor 32.

The same steps of flash vaporization and vapor compression occur in stages III and IV. From vapor compressor 57 of stage III, a quantum of superheated steam at a saturation temperature of 294° F is discharged into line 59 connected to distributor 32", and from vapor compressor 55 of stage IV, a quantum of superheated steam at a saturation temperature of 285° F is discharged into line 58 connected to distributor 32'''. These temperatures are in each instance some 10° F greater than that of the saline water at said distributors.

From the flash vaporizing saline water a total of 36 lbs. of vapor will have separated, divided approximately equally among the vapor compressors of stages I to IV. The resulting cooled post-thermal saline water exiting in line 52 weighs 1000 lbs., the same as the saline water initially in line 10. The temperature is 269.7° F, characteristically slightly less than the preheat temperature of 270° F.

In order to secure the required pressures at the vapor compressors of steam regenerator 48, appropriate controls may be applied. A pressure regulator may be installed in the intake line of each vapor compressor, whereby its suction pressure conforms to the pressure of flash vaporization in the connected chamber. Another pressure regulator may be installed across a compressed vapor line and the site at thermoprecipitator 27 of the connected distributor, whereby the pressure in said line is at a properly high differential with respect to the saline water at said distributor.

The division of the flashed vapor into quanta of regenerated steam, instead of one output corresponding to the maximum temperature of precipitation, is advantageous in simplifying the problem of supersaturation and of obtaining a least energy of vapor compression. In the case of the four vapor compressors of steam regenerator 48, the pressure compression ratio is nearly the same for each at about 1.30. At the maximum precipitation temperature of 302° F, the overall energy of compression in kwh/1000 gal. fresh water, at 75% vapor compressor efficiency, is 1.0 at a null differential of temperature between compressed vapor and saline water, and 1.7 at a differential of 5° F.

At a maximum precipitation temperature of 347° F, eight stages of flash vaporization in steam regenerator 48 result in approximately the same pressure compression ratio of 1.30. A total of 91 lb. of steam quanta per 1000 lbs saline water is required, and the overall energy of compression in kwh/1000 gal. fresh water is 2.4 at a null differential and 4.0 at a 5° F differential.

In thermoprecipitator 27, the quantum of steam rising through the saline water from distributor 32 encounters decreasing temperatures, upon which the supersaturation is completely destroyed andd saturated steam progressively condenses at the decreasing temperatures up to sequential distributor 32'. Upon arriving thereat, very little of the quantum remains while its temperature ideally will have decreased to the 302° F at said distributor. Whether or not, however, this is the case, within limits, compensation occurs among the distributors in providing fairly uniform further heating of the saline water to the maximum temperature of precipitation.

At uppermost distributor 32''' the quantum of steam after desupersaturation condenses, starting at 285° F and ending completely condensed at 280° F, 10° F above the temperature of final preheat of the saline water. Present also at 280° F is accessory steam, figuratively distinguished from said quantum of steam at that temperature. A total of 11 lbs. of accessory steam is required to finally preheat the 1000 lbs. of saline water in steam heater 25. A portion of the 11 lbs. passes as excess steam into the vapor space above the saline water out into line 33 to said steam heater 25; another portion of accessory steam, to as little as zero, is passed directly to said steam heater 25 from line 41 by way of line 33.

The accessory steam in line 33 will have entered thermoprecipitator 27 from line 40 connected to line 64, in which the quantum of steam therein and said accessory steam together pass to distributor 32; alternately, the accessory steam may be combined with any one or a plurality of quanta of steam passing into said thermoprecipitator or it may be separately passed thereto.

While in the thermoprecipitator, the accessory steam serves to gather and expel the carbon dioxide, and furthermore, by reducing its partial pressure hastens to completion the thermal decomposition of the bicarbonates.

The steam condensing in thermoprecipitator 27 causes turbulence which supplements the high temperatures in bringing the precipitation reaction to early equilibrium. The multiple condensations due to the steam being quantized serve desirably to flatten the turbulence across the thermoprecipitator. At the maximum precipitation temperature of 302° F about 50% of the calcium sulfate in sea water will have precipitated as anhydrite, and at 347° F about 70% will have so precipitated.

In the clarification zone of thermoprecipitator 27, sedimentation is rapid in view of the high-temperature granularity of the precipitate; and the post-thermal saline water will have been highly clarified on its way to steam regenerator 48.

The cooled post-thermal saline water exiting in line 52 of said steam regenerator may be directly evaporated, employing a multiple effect evaporator, or one followed by a vapor compression evaporator. However, it is preferably further cooled by passing it through heat exchanger 23, from which it flows into line 66 to chamber 68 of stage I of vapor compression evaporator 67. The pressure in said chamber is above atmospheric in order to prevent the ingress of air, and the temperature is closely above 212° F, since the solubility of anhydrite, on which the concentration factor in evaporation depends, is inverse with temperature.

Vapor compression evaporator 67 is multistage in order for economy to fraction the boiling point elevation, which is as much as 6° F for sea water concentrated five-fold, and to carry out separately marginal evaporation in the range of highest concentration. Each of the four stages I to IV shown, comprises an evaporation chamber containing heat transfer tubes and a communicating vapor compressor. Vapor from boiling saline water in the heat transfer tubes passes to the compressor, from which compressed vapor is delivered to the originating chamber. As the vapor condenses and condensate is formed, it transfers heat to the evaporating saline water.

Following now the further cooled, post-thermal saline water in chamber 68 of stage I, it passes as saline water concentrate into line 69 to chamber 70 of stage II, and sequentially thereafter into line 78 to chamber 71 of stage III and line 79 to chamber 72 of stage IV. From this it issues in line 73 as evaporator concentrate, passing thence into heat exchanger 19 and exiting as saline water residuum or brine at a temperature slightly above that of the original saline water counterflowing in said heat exchanger.

Reverting to stage I of evaporator 67, vapor passes into compressor 75 from chamber 68 and line 105; compressed with superheat, it condenses in said chamber, from which condensate issues in line 107 to collecting line 74. Other condensates at sequentially higher temperatures likewise pass from the chambers of stages II, III and IV into said collecting line. From this the total issues as evaporator condensate to heat exchanger 18, from which it exits as fresh water at a temperature slightly above that of the counterflowing, original saline water in said heat exchanger.

For sea water under the condition of equilibrium at a maximum precipitation temperature of 302° F, the recovery of fresh water up to incipient anhydrite precipitation during evaporation at slightly above 212° F is 70%; of this, 40% recovery may be obtained in stage I, 20% in stage II and 10% in stage III. At a maximum precipitation temperature of 347° F, the recovery is, similarly, 80%; a further 10% recovery may be obtained in stage IV. Evaporation beyond these limits may be considered enhanced, since anhydrite is apt to precipitate and form scale. If proceeded with, the scale may be circumvented by effecting body precipitation upon added anhydrite and its growth product. Assuming an enhanced recovery is to be obtained in stage IV, purchased anhydrite may be added from line 88 through lines 86 and 95 to the saline water in line 79 connected to chamber 72 of stage IV; alternately, the precipitate formed in thermoprecipitator 27, being mostly anhydrite, may be added from line 46 through lines 86 and 95 to the saline water in line 79 and chamber 72.

At the high saline water concentrations in stages III and IV, magnesium hydroxide may precipitate due to hydrolysis. In order to prevent this, the saline water may be acidified in those stages. Considering in particular stage IV, a slight amount of sulfuric acid may be added from line 94 and lines 92 and 95 to the saline water in line 79 connected to chamber 72 of stage IV; alternately, body precipitation may be effected upon added magnesium hydroxide and its growth product. Purchased magnesium hydroxide in line 81 may be passed through lines 90,91,92 and 95 to line 79 connected to chamber 72; alternately, magnesium hydroxide, manufactured from lime as above described, may be passed from point 82 through lines 93,91,92 and 95 to said line 79 and chamber 72.

As compared with a single stage vapor compression evaporator, a multistage one has certain advantages. It results in restricting to small sections of the evaporator the more difficult higher concentrations, and attempts at enhanced recovery of fresh water. By fractioning the boiling point elevation and narrowing the temperature differential in vapor compression, it provides for high compressor efficiency.

The heat transfer between compressed vapor and boiling saline water may be improved by desuperheating the vapor. For this a slight amount of water added to the vapor entering or issuing from the compressor suffices. Preferably, hot evaporator condensate is employed, and combined with compressed vapor as this issues from the compressor. Connected to line 74 through which evaporator condensate flows, line 108 communicates with water pump 109, which discharges said evaporator condensate into line 110 connecting with the outlets of each vapor compressor, typically through line 111 with outlet 106 of vapor compressor 75 of stage I.

The energy required by any vapor compressor of multistage vapor compression evaporator 67 is practically proportional to the temperature differential between the saturation temperature of the compressed vapor and of the vapor passing into the compressor. When the differential is 5° F at 75% vapor compressor efficiency and a fresh water recovery of 70% and 80%, the average energy is 24 kwh/1000 gal. fresh water. This value, it will be observed, is several times greater than the energy of vapor compression required in steeam regenerator 48, lying in the range 1.0 to 4.0 KwH/1000 gal. fresh water, as stated above.

The recovery of fresh water in evaporator 67 depends not only upon the maximum temperature of scale-compound precipitation, but also upon the salinity. For brackish waters, the recovery is greater than for sea water. At 3,500 ppm NaCl, which is one-tenth the salinity of sea water, the recovery relative to equilibrium at a maximum temperature of 302° F is 80%, and relative to that at 347° F, it is 90%. In each instance, therefore, the recovery is greater than for sea water by an increment of 10%. The stated higher recovery is fairly constant over a wide range of brackish water salinities.

Having thus described my invention, it will be recognized that adaptations thereof may be made that are within the skill of the art and fall within the spirit and scope of the invention as claimed.

I claim:

1. A process for the conversion of saline water containing scale-forming compounds to fresh water, which comprises indirectly preheating the saline water; to the preheated saline water, passing quanta of steam which are sequentially increasing temperatures and pressures and condensing the quanta of steam in the saline water at points which are at corresponding lesser temperatures and pressures, thereby further heating the preheated saline water; as a result of the further heating, precipitating scale compounds in the saline water and decomposing scale-forming bicarbonates with the evolution of carbon dioxide; separating the precipitated scale compounds and carbon dioxide, forming post-thermal saline water; flash vaporizing the post-thermal saline water in stages of decreasing temperature and forming cooled, post-thermal saline water; compressing the flashed vapors of each said stage and passing the compressed vapors to the preheated saline water as said quanta of steam; and evaporating said cooled, post-thermal saline water to produce fresh water and saline water residuum.

2. Claim 1, wherein accessory steam in part indirectly preheats saline water before said further heating thereof.

3. Claim 1, wherein solids, selected from among said precipitate of scale compounds, anhydrite and magnesium hydroxide, are added as seed to the further heating saline water, whereby the precipitation of scale compounds and the decomposition of scale-forming bicarbonates are hastened.

4. Claim 1, wherein accessory steam is passed through the further heating saline water and excess steam including carbon dioxide is separated from the saline water.

5. Claim 4, wherein separated, excess steam indirectly preheats saline water, forming hot condensate, and carbon dioxide issues from hot condensate.

6. Claim 5, wherein a part of the carbon dioxide that issues is passed to saline water, whereby in the preheating thereof alkaline scale is prevented.

7. Claim 1, wherein cooled, post-thermal saline water is further cooled while indirectly preheating saline water; and the further cooled, post-thermal saline water is evaporated in a vapor compression evaporator.

8. Claim 7, wherein said vapor compression evaporator is in multistage, each stage comprising an evaporation chamber and a connected vapor compressor; compressed vapor indirectly heats saline water in each said chamber, forming condensate therein and saline water concentrate, the latter passing sequentially through chambers of increasing saline water concentration, and finally issuing as evaporator concentrate; and the condensers of each stage are collected to form issuing evaporator condensate; and evaporator condensate and concentrate are cooled to produce fresh water and saline water residuum respectively.

9. Claim 8, wherein water is combined with each said compressed vapor, whereby to desupersaturate it before it indirectly heats saline water.

10. Claim 8, wherein solids, selected from among anhydrite and a precipitate of scale compounds formed according to claim 1, are added as seed to the saline water present in a stage of high saline water concentration, whereby to effect body precipitation on said solids by the anhydrite which may precipitate from solution upon further evaporation of the saline water.

11. Claim 8, wherein acid is added to the saline water in a stage of high saline water concentration, whereby to prevent the hydrolytic precipitation of magnesium hydroxide from the saline water.

12. Claim 8, wherein solids, selected from among magnesium hydroxide and a precipitate formed by adding lime to a solution containing magnesium ion, is added to the saline water in a stage of high saline water concentration, whereby to effect body precipitation on said solids of magnesium hydroxide which may hydrolytically precipitate from the saline water upon further evaporation.

13. A process for the conversion of saline water containing scale-forminng compounds to fresh water, which comprises indirectly preheating the saline water; to the preheated saline water, passing quanta of steam which are at sequentially increasing temperatures and pressures and condensing the quanta of steam in the saline water at points which are at correspondingly lesser temperatures and pressures, thereby further heating the preheated saline water; as a result of the further heating, precipitating scale compounds in the saline water and decomposing scale-forming bicarbonates with the evolution of carbon dioxide; separating the precipitated scale compounds and carbon dioxide, forming post-thermal saline water; flash vaporizing the post-thermal saline water and forming cooled, post-thermal saline water; and evaporating cooled, post-thermal saline water to form fresh water and saline water residuum.

14. Claim 13, wherein the post-thermal saline water is flash vaporized in stages of decreasing temperature and the flashed vapors are recovered and employed to form quanta of steam.

15. Claim 14, wherein the recovered flashed vapors are compressed to form said quanta of steam.

* * * * *